United States Patent
Alakula et al.

(10) Patent No.: US 9,931,939 B2
(45) Date of Patent: Apr. 3, 2018

(54) ELECTRICAL APPARATUS AND METHOD FOR CHARGING A BATTERY

(75) Inventors: Mats Alakula, Lund (SE); Erik Hoevenaars, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 397 days.

(21) Appl. No.: 14/405,161

(22) PCT Filed: Jun. 5, 2012

(86) PCT No.: PCT/EP2012/002378
§ 371 (c)(1),
(2), (4) Date: Jun. 24, 2015

(87) PCT Pub. No.: WO2013/182211
PCT Pub. Date: Dec. 12, 2013

(65) Prior Publication Data
US 2015/0314694 A1   Nov. 5, 2015

(51) Int. Cl.
*H02J 7/00*   (2006.01)
*B60L 3/00*   (2006.01)
(Continued)

(52) U.S. Cl.
CPC ......... *B60L 3/0069* (2013.01); *B60L 11/1803* (2013.01); *B60L 11/1812* (2013.01);
(Continued)

(58) Field of Classification Search
CPC ..... Y02T 90/14; Y02T 90/128; Y02T 10/163; Y02T 10/7005; Y02T 10/7088;
(Continued)

(56) References Cited

U.S. PATENT DOCUMENTS 4,920,475 A * 4/1990 Rippel ................ B60L 11/1803
363/132
7,096,985 B2   8/2006 Charaudeau et al.
(Continued)

FOREIGN PATENT DOCUMENTS

DE   10 2009 007961 A1   8/2010
GB   2 235 836 A   3/1991

OTHER PUBLICATIONS

International Search Report (dated Mar. 20, 2013) for corresponding International App. PCT/EP2012/002378.
(Continued)

*Primary Examiner* — Yalkew Fantu
*Assistant Examiner* — Mohammed J Sharief
(74) *Attorney, Agent, or Firm* — WRB-IP LLP

(57) ABSTRACT

An electrical apparatus is provided including an electrical drive system and an electrical machine. The electrical machine includes a rotor, a first separate multi-phase stator winding and a second separate multi-phase stator winding. The drive system includes a first multi phase bridge inverter connected to the first multi-phase stator winding and which is adapted to be connected to a line voltage supply by a connection means when charging a battery. The apparatus further includes a second multi-phase bridge inverter connected to the second multi-phase stator winding and to the battery. A battery can be charged without the need of a specific charger and charging with galvanic isolation is provided.

9 Claims, 2 Drawing Sheets

(51) Int. Cl.
*B60L 11/18* (2006.01)
*B60L 15/00* (2006.01)
*H02J 7/02* (2016.01)
*H02P 23/28* (2016.01)

(52) U.S. Cl.
CPC ....... *B60L 11/1814* (2013.01); *B60L 11/1816* (2013.01); *B60L 15/007* (2013.01); *H02J 7/022* (2013.01); *H02P 23/28* (2016.02); *B60L 2210/30* (2013.01); *B60L 2210/40* (2013.01); *B60L 2210/44* (2013.01); *B60L 2220/12* (2013.01); *B60L 2220/14* (2013.01); *B60L 2220/16* (2013.01); *B60L 2220/18* (2013.01); *B60L 2220/54* (2013.01); *Y02T 10/641* (2013.01); *Y02T 10/645* (2013.01); *Y02T 10/7005* (2013.01); *Y02T 10/7072* (2013.01); *Y02T 10/7241* (2013.01); *Y02T 90/127* (2013.01); *Y02T 90/14* (2013.01)

(58) Field of Classification Search
CPC .. Y02T 10/64; B60L 11/1803; B60L 11/1812; B60L 11/1814; B60L 11/1816; B60L 15/007; B60L 2210/30; B60L 2210/40; B60L 2210/44; B60L 2220/12; B60L 2220/14; B60L 2220/16; B60L 2220/18; B60L 2220/54; H02J 7/022

USPC ...................................................... 320/109
See application file for complete search history.

(56) References Cited

U.S. PATENT DOCUMENTS

| 2004/0124805 | A1* | 7/2004 | Edwards | H02M 7/487 318/700 |
| 2008/0094013 | A1* | 4/2008 | Su | B60L 11/1811 318/139 |
| 2009/0160247 | A1* | 6/2009 | Nakamura | B60K 6/365 307/9.1 |
| 2009/0301801 | A1 | 12/2009 | Fujitake | |
| 2010/0096926 | A1 | 4/2010 | King et al. | |
| 2010/0219794 | A1* | 9/2010 | Sugimoto | B60K 6/445 320/128 |

OTHER PUBLICATIONS

International Preliminary Report on Patentability (dated Oct. 9, 2014) for corresponding International App. PCT/EP2012/002378.
WO9301650A1 (dated Jan. 21, 1993) Siemens Aktiengesellschaft (Englsih Abstract and original document).
CN101976894A (dated Feb. 16, 2011) Univ Nanjing Science & Tech (English Abstract and original document).
CN102069721 (dated May 25, 2011) Res Inst of Xi An Jiaotong University in Suzhou (English Abstract and original document).

* cited by examiner

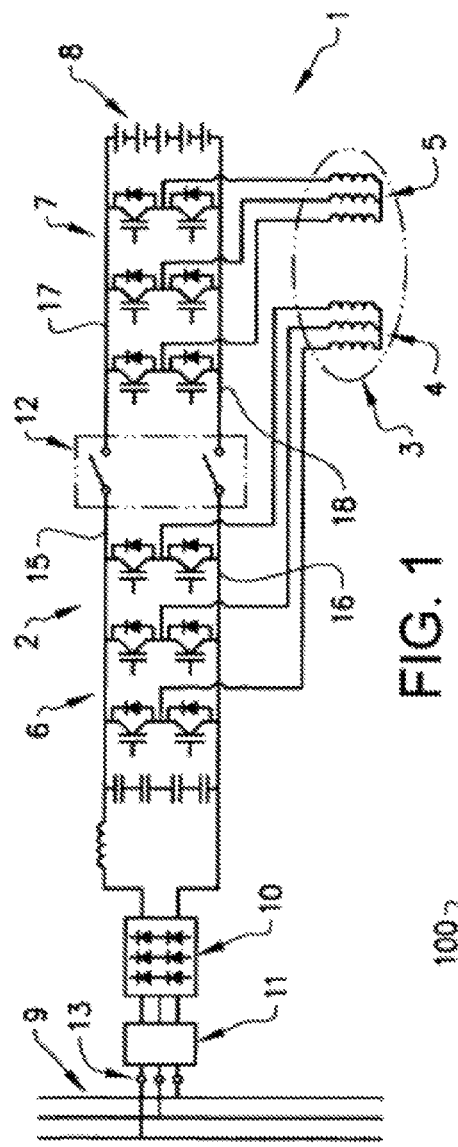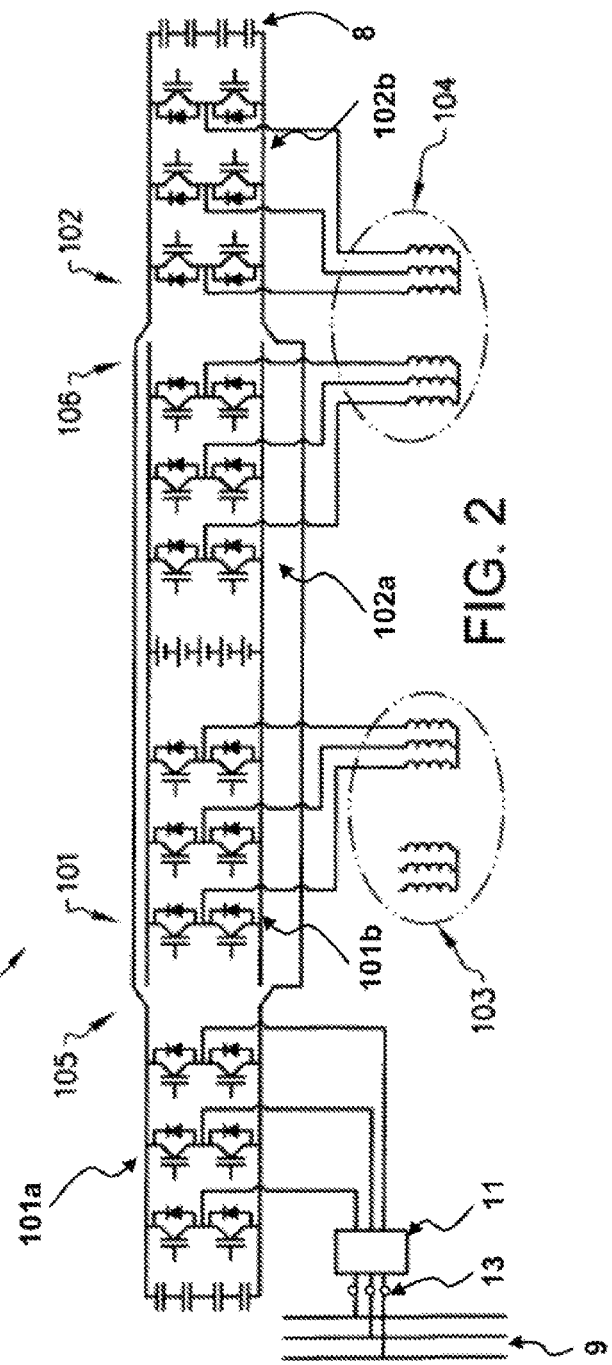

ELECTRICAL APPARATUS AND METHOD FOR CHARGING A BATTERY

BACKGROUND AND SUMMARY

The present invention relates to an electrical apparatus fir charging a battery from a voltage grid and further to a method for charging a battery from a voltage grid. The apparatus is suitable for electric vehicles and other machines comprising an electrical machine.

The share of partly or only electrically driven vehicles is expected to increase radically in the next 10 to 20 years. This also means a corresponding increase in the need to charge such vehicles. In principle, the charging is done by connecting the vehicle to the electrical network, either directly to one of the ordinary outlets used for other equipments, or through a special charger, external to the vehicle. Charging current transferred from the network to a battery on board the vehicle. In the latter case with an external charger, standardization is needed so that vehicles from different manufacturers can all be charged from the same type of outlet.

A passenger car uses around 2 kWh of electrical energy per 10 km for its propulsion. An ordinary single-phase outlet is, in some markets, fuse-protected with 10 A, which limits the power transfer to about 2 kW at 230 V. This means that a vehicle which is charged from such an outlet receives energy for around 10 kilometers of driving each hour it is connected to the charge. Heavier vehicles use even more energy per kilometer.

To increase the charging power it is possible to use a 3-phase outlet. These are found in many locations, fuse-protected with e.g. 16, 32 and 63 A, and possibly even higher amperages. The connectors used are strictly standardized but already for 63 A they are so large and cumbersome to handle that one cannot expect any normal person, perhaps wearing good clothing, to manually handle the connecting process. Hence 32 A could be considered to be an upper practical limit on the current level which a manually operated standard 3-phase contact device can utilize, but in some cases 63 A connectors can also be considered. With special purpose outlets and connectors, higher current connections can also be expected to be manually handled. It should be noted that already 32 A is considerably more than the fuse protection of a normal house. At 400 V 3-phase 32 A. the active power is 22 kW, i.e. a passenger car connected to such a charging outlet will receive energy for about 100 kilometers of driving for each hour it is connected fir charging. Charging times for electric vehicles are thus significantly longer than when conventional vehicles are fuelled with typically a 1000 kilometers driving range in 5 minutes. A relatively large portion of a hypothetical electrical vehicle fleet will probably be charged at night from ordinary 10 A or 16 A single phase outlets, which still gives a relatively long driving distance during a night of 10 hours charging. With a large share of electrical vehicles, however, it is likely that many of them will need to be fast-charged also in the daytime, e.g. with 22 kW as from a 400 V 3-phase 32 A outlet. Since the charging time for these still will be relatively long (typically 30 to 60 minutes), it probably does not make sense to have special charging outlets, since very many of them would be needed as compared to today's petrol stations. Instead, it is useful if these vehicles can be charged from an ordinary outlet, e.g. ranging from 230 V, 10 A 1-phase to 400 V 63 A 3-phase, or even higher currents if suitable plugs are used. These can be installed at very low costs at very many locations, e.g. parking structures in residential districts, shopping centres, offices, industrial sites, etc.

In order for a vehicle to make use of an ordinary electrical outlet, it is necessary that the vehicle itself carries the necessary charging equipment.

With a rated charging power of up to 400 V, 63 A 3-phase, providing galvanic isolation, a rather heavy (>100 kg, if a 50 Hz transformer is located on board to provide the galvanic isolation) and costly (>10,000 SEK) equipment is needed on board. Since an electric vehicle is costly already from the outset, especially on account of the costs of the batteries, it is burdened with additional costs for the charger requirement. Therefore, an integrated charging, i.e. a charging method using traction hardware, is an interesting solution to provide on-board chargers. It is known how to configure an electrical machine to operate as a transformer or commutation inductance and how to use it in combination with the power electronics to charge the battery.

One example of such a design consisting of a divisible motor winding is exhibited and described in JP10248172. One part of the motor winding can be connected to the network during charging. The design calls for a single-phase connection and driving with so-called "common mode" current, that is, the same current in all three phases of the motor.

In U.S. Pat. No. 5,341,075 there is disclosed a combined motor power and battery charging system. Two of the motor's three phase windings are used as inductors during single-phase charging of an electric vehicle battery. One requirement is that the battery voltage be higher than the highest instantaneous value of the network voltage. A significant disadvantage is that no galvanic isolation can be provided between the network the and battery. A similar solution is described in U.S. Pat. No. 5,099,186. However, two totally separate motor windings are used. Yet another solution is disclosed in U.S. Pat. No. 4,920,475.

In accordance with the above described prior art, galvanic isolation is not possible in connection with the charging of the batteries. Another drawback is that the power made available for the charging is too low. The main drawback of previously known non-isolated battery chargers is the need for a heavy and expensive Common Mode filter in order to limit common mode currents and to maintain proper grounding and safety when touching the vehicle during charging. The main drawback of previously known isolated battery chargers is low efficiency, which is to a large extent related to the need for a magnetization current.

WO 2011/159241 describes an integrated motor drive and charger based on a permanent magnet synchronous machine, in which galvanic isolation is obtained by using an electric machine with two stator windings. Both stator windings are connected in series during traction mode. However, during charging mode the stator windings are reconfigured with a switch device into a motor/generator set, which is also referred to as a rotating transformer. The rotor needs to rotate at synchronous speed (=grid frequency) during charging mode. The maximum charging power of this arrangement is below half of the maximum continuous electrical machine power. This allows for galvanic isolation at a high efficiency level of power conversion. One drawback is that the rotor must be mechanically disconnected from the rest of the system in order to be able to rotate during charging. In an electric vehicle, the clutch must thus be disengaged. Further, a relatively complicated switching device is necessary for reconfiguration of the windings.

Hence, there is a need for an improved charging arrangement for an electric machine using the electrical traction drive components.

It is desirable to provide an improved arrangement for charging a battery in a system comprising an electrical machine having two separate stator windings. It is also desirable to provide an improved method for charging a battery in a system comprising an electrical machine having two separate stator windings.

In an electrical apparatus for charging a battery, comprising an electrical drive system and an electrical machine, wherein the electrical machine comprises a rotor, a first separate multi-phase stator winding and a second separate multi-phase stator winding, wherein the drive system comprises a first multi-phase bridge inverter connected to the first multiphase stator winding and which is adapted to be connected to a grid/line voltage supply by a connection means when charging a battery, the apparatus further comprises a second multi-phase bridge inverter connected to the second multiphase stator winding and to the battery. The connection means between the first multi-phase inverter and the grid comprises a controlled or non-controlled rectifier and filter components, either passive or active.

By this first embodiment of the electrical apparatus for charging a battery according to the invention, a method for charging a battery by using the existing electrical machine and the existing drive components for e.g. driving an electric vehicle is obtained. The electrical machine comprises a rotor and two separate multi-phase stator windings and the drive system comprises two multi-phase bridge inverters, where one multi-phase bridge inverter is connected to one multi-phase stator winding and which is also adapted to be connected to a rectified line voltage supply in order to supply charging voltage to the system. The other multi-phase bridge inverter is connected to the other multi-phase stator winding and also to the battery that is to be charged. During charging, when energy is supplied from the line voltage supply, the rectifying means converts the line voltage to a predominantly DC voltage, the first multi-phase bridge inverter will drive the first stator winding such that the electric machine rotates with a predefined rotational speed. Since the stator winding is powered through the multi-phase bridge inverter, the rotational speed can be adapted to the optimal speed of the electrical machine for the charging power level intended, i.e. to the rotational speed at which the electrical machine is the most efficient. For traction motors, the optimal speed for charging is usually higher than the frequency of the line supply and hence, charging at the line supply frequency decreases the maximum charging power and eliminates the chances to select the optimum speed.

Normally, the frequency of the line voltage is low, 50 or 60 Hz, and the electric machine is designed to operate in a frequency range from zero to several hundred Hertz. By creating the desired frequency with the first multi-phase bridge inverter, the efficiency of the charging process can be optimized. In this way, galvanic isolated charging with high efficiency is obtained, which allows for charging at up to half of the rated electrical machine power since the electric machine can be driven at the optimal speed and is not fixed to be driven at the line voltage frequency. The desired frequency can be created from any type of input, e.g. DC voltage, single-phase AC, multi-phase AC or from inputs having other types of voltage waveforms. In this way, it is also possible to use the same electronics to charge the battery with different line voltages. The line voltage can thus be both one phase and multi-phase and the line voltage may have different potentials and different frequencies. It is also possible to connect the electrical apparatus to a DC supply, which is common for charging electrical vehicles.

In the inventive method for charging a battery in an electrical apparatus, such as an electrical vehicle, the steps of applying a line voltage via a rectifying means creating a first DC link voltage from which the multiphase bridge inverter, that is connected from said DC link voltage to the first multi-phase stator winding, drives controlled currents through said winding such that the rotor is forced to rotate at the desired speed, such that the controlled current of the second multi-phase winding, that is connected to the second multi-phase inverter which has the battery to be charged in its DC link, generates the desired power flow to the battery, thus creating a charge current to the battery are comprised.

In this method, galvanic isolated charging with high efficiency is obtained by using two separate multi-phase bridge inverters connected to two separate stator windings in the electrical machine. Battery charging at half of the rated electrical machine power can thus be achieved.

BRIEF DESCRIPTION OF DRAWINGS

The invention will be described in greater detail in the following, with reference to the attached drawings, in which FIG. 1 shows a first embodiment of an electrical apparatus according to the invention, with two sets of 3-phase windings.

FIG. 2 shows an example with two electrical drive systems and two electric machines according to the invention.

DETAILED DESCRIPTION

Figure 3:
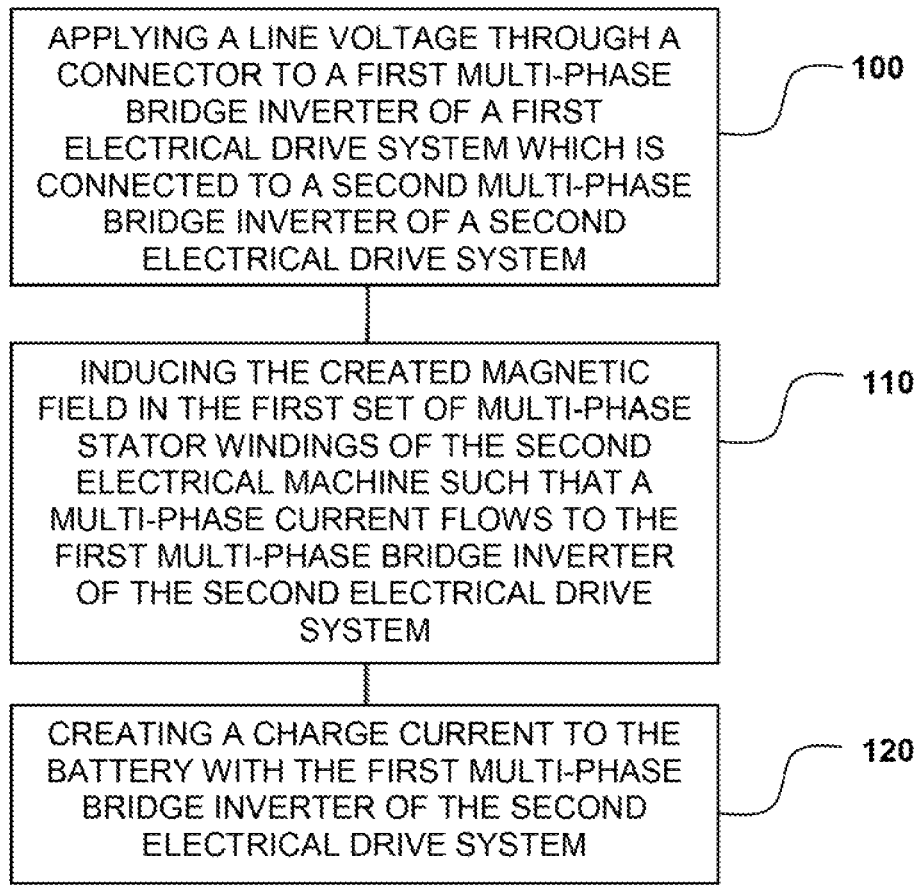
FIG. 3 shows a schematic flow chart of the inventive method.

The embodiments of the invention with further developments described in the following are to be regarded only as examples and are in no way to limit the scope of the protection provided by the patent claims.

FIG. 1 shows an electrical apparatus 1 for charging a battery 8. In the described example, the electrical apparatus is integrated in an electrical vehicle and the electrical machine is used as a power source for driving the electrical vehicle when the drive system is in a traction mode. The electrical machine may however also be used for other purposes, e.g. to power different rotational equipment such as hydraulic pumps on construction equipment vehicles. The electrical apparatus 1 comprises an electrical drive system 2 and an electrical machine 3. The electrical drive system is controlled by an electronic control unit in a known manner and is not described further.

The electrical machine 3 comprises a rotor (not shown) and two separate multi-phase stator windings. The number of phases used in the electrical machine can be selected according to the requirements and on the design of the drive system. A suitable number of phases are e.g. three or five. In the described examples, a three phase system is used. The electrical machine thus comprises a first three-phase stator winding 4 and a second three-phase stator winding 5. The stator windings are separated from each other but are magnetically connected to each other and are positioned on the same stator of the electric machine. The electrical machine may be any type of suitable electrical machine, such as (but not limited to) a permanent magnet synchronous machine, a wound rotor synchronous machine, a switched reluctance machine, a wound rotor induction machine or a synchronous reluctance machine.

The electrical drive system 2 comprises multi-phase drive stages adapted to the used electrical machines. In the described example, a three phase drive system is used. The electrical drive system thus comprises a first three-phase bridge inverter 6 connected to the first three-phase stator winding 4 and a second three-phase bridge inverter 7 connected to the second three-phase stator winding 5. The first three-phase bridge inverter 6 is adapted to be connected to a grid or a line voltage supply 9 through a rectifier means, and a connector 13 of some sort. The connector 13 may be any suitable type and is preferably adapted to the available line voltage and is preferably a standard connector. Depending on the line voltage to which the electrical apparatus should be connected to, the first three-phase bridge inverters is also connected to a line filter 11 adapted to fulfil relevant EMC-standards and if possible retain the power factor close to 1 at the supply side, and a rectifier 10 adapted to rectify AC voltage. Additional components adapted for the power conversion at the inlet side may also be used. The first three-phase bridge inverter will have a high potential side 15 and a low potential side 16.

The second three-phase bridge inverter 7 is connected to the second three-phase stator winding 5. The second three-phase bridge inverter 7 is further connected to the battery 8, which is to be charged through the electrical apparatus and which is adapted to power the electrical vehicle when driving. The battery may be any suitable battery type. The second three-phase bridge inverter will have a high potential side 17 and a low potential side 18.

The three-phase bridge inverters are of a well-known type and may e.g. comprise IGBTs, IGCTs or MOSFETs. They may also be multi-level inverters.

During charging, the inlet is connected to a line voltage supply from which the battery is to be charged. The line voltage may be a single phase low voltage supply having e.g. 240 volts and a 10 A fuse which will give a relatively long charging time. The line voltage is more preferred a three-phase supply, e.g. a three-phase 400 volts supply with a 32 or 63 A fuse, which will allow a higher charging capacity and a faster charging. The supply may also be a DC supply, e.g. of the Chademo standard or just another battery. The AC voltage is rectified by the rectifier and the rectified DC voltage is supplied to the first three-phase bridge inverters, which converts the DC voltage to an AC voltage by means of a speed- and current control system, which voltage is then fed to the first stator winding. The electrical machine will thus rotate with the desired speed of the electrical machine during the charging process. The rotation causes an induced voltage in the second stator winding. The second three-phase bridge inverter is controlled in such a way that it brakes the motor with the desired torque and thus acts as a rectifier and rectifies the energy to a direct current which charges the battery.

Depending on the charging requirements for charging the battery, an optimal combination of speed and torque is used to create the requested charging power. For example: when the battery should be charged at maximum power, the electrical machine is the limiting factor for the charging, and the charging is done at half of the rated machine power and at the base speed of the electrical machine. If it is possible to charge the battery at a lower charging rate, this is preferred in order to preserve the battery. When the battery is charged at a lower power level, the desired speed can be set to a speed lower than the base speed. Dependent on required charging rate, the speed of the electrical machine that corresponds to an optimal efficiency may vary between zero and base speed during the charging mode. Since the electrical machine is not driven directly from the grid with the line voltage frequency, the drive frequency of the electrical machine during charging can be set to any desired value. In order to retain the highest possible machine efficiency during charging, an optimal combination of speed and torque is used, which is different for every level of requested charging power.

By using two separate stator windings of the electrical machine, galvanic isolated charging of the battery is obtained without the need of any extra components as compared to those used in the drive mode of the electrical apparatus, with the exception of the switch 12, the rectifier 10 and the line filter 11. The electrical apparatus may also comprise a switch 12 adapted to connect the first and the second three-phase bridge inverters to each other. The two three-phase bridge inverters are not connected to each other during charging, since the galvanic isolation would disappear and since the DC link voltage of the first inverter 6 when connected to the grid is not likely to be the one needed to charge the battery in any given time instant. The switch is only to be closed during driving of the vehicle. When the two inverters are connected, the low potential sides 16 and 18 will be connected to each other and the high potential sides 15 and 17 will be connected to each other. In this way, both three-phase bridge inverters can be used to drive the electric machine during traction of the vehicle. During driving, each three-phase inverter will thus invert only half of the peak power, which makes it possible to use smaller inverter components, e.g. IGRT modules, BJT modules, MOSFET modules etc. The total required silicon area will thus not increase compared to a single inverter drive system rated for equal traction power and DC link voltage levels.

FIG. 2 shows an example of an electrical apparatus 100 comprising two electrical drive systems and two electric machines. In this example, a first electrical drive system 101 powers a first electrical machine 103 and a second electrical drive system 102 powers a second electric machine 104. During driving, i.e. in the traction mode, a first switch 105 is closed such that it connects the two three-phase bridge inverters 101*a* and 101*b* of the first electrical drive system 101 and a second switch 106 is closed such that it connects the two three-phase bridge inverters 102*a* and 102*b* of the second electrical drive system 102. In the charging mode, shown in FIG. 2, the switches are opened such that the first three-phase bridge inverter 101*a* of the first electrical drive system 101 is connected to the second three-phase bridge inverter 102*b* of the second electrical drive system 102. The first three-phase bridge inverter 101*a* is connected to a line voltage supply, preferably through a line filter. In the shown example, the line voltage supply is an AC supply. The first three-phase bridge inverter 101*a* is here used as a diode rectifier. The rectified DC voltage is fed to the second three-phase bridge inverter 102*b* of the second electrical drive system 102, which powers the second stator winding of the second electrical machine with an appropriate frequency, adapted to the design of the electrical machine as described above. The first stator winding of the second electrical machine 104 will charge the battery through the first three-phase bridge inverter 102*a* of the second electrical drive system 102. In this example, doubled traction power is provided compared with a single drive system having the same power ratings of the components. In this example, an additional rectifier is not necessary since one of the bridge inverters is used for rectification of the line supply voltage. The maximum charging power will be ¼ of the total continuous traction power, since only one electrical machine is used to charge the battery. The two electrical machines can be used for different purposes, e.g. vehicle traction and rotational motion in construction equipment. A further advantage of using two or more motor drive systems in parallel, which may also be referred to as modular scaling, is that a redundancy is obtained. If one of the drive systems fails e.g. because of a faulty part in one of the drive systems, that drive system can be disconnected and the system can be used with the remaining drive system or systems. In this way, both traction and charging can be made with a lower efficiency and/or with a reduced power handling. In an electrical vehicle, this can e.g. be used as a limp home function. FIG. 3 shows a schematic flow chart of the method for charging a battery in an electrical apparatus comprising an electrical drive system and an electrical machine.

In step 100, a line voltage is, via a line filter and a rectifying means, applied to the first three-phase bridge inverter, thus creating a DC link voltage of said inverter. The inverter is connected to the first separate three-phase stator winding of the electrical machine and controlled in such a way that a desired current flows through the first three-phase stator winding. Hence, the torque level varies and the rotor speed of the machine is stabilized at the desired level.

In step 110, the currents of the second three-phase stator winding of the electrical machine are controlled by means of the second three-phase bridge inverter such that the torque level of the second winding together with the speed gives a power flow from the machine to the battery, resulting in a charge current on the DC side of the second inverter that flows to the battery.

In step 120, the battery is charged by the charge current created by the second three-phase bridge inverter.

The invention is not to be regarded as being limited to the embodiments described above, a number of additional variants and modifications being possible within the scope of the subsequent patent claims.

REFERENCE SIGNS

1: Electrical apparatus
2: Electrical drive system
3: Electrical machine
4: First three-phase stator winding
5: Second three-phase stator winding
6: First three-phase bridge inverter
7: Second three-phase bridge inverter
8: Battery
9: Line voltage supply
10: Rectifier
11: Line filter
12: Switch
13: Connection means
15: High potential side
16: Low potential side
17: High potential side
18: Low potential side
100: Electrical apparatus
101: First electrical drive system
102: Second electrical drive system
103: First electric machine
104: Second electric machine
105: First switch
106: Second switch

The invention claimed is:
1. An electrical apparatus, comprising:
a first electrical drive system,
a second electrical drive system,
a first electrical machine,
a second electrical machine, and
a battery,
wherein each electrical machine comprises a rotor, a first set of multi-phase stator windings and a second set of multi-phase stator windings electrically separated from the first set of multi-phase stator windings,
where the first electrical drive system comprises a first multi-phase bridge inverter and a second multi-phase bridge inverter,
where the second electrical drive system comprises a first multi-phase bridge inverter connected to the first set of multi-phase stator windings of the second electrical machine and to the battery, and a second multi-phase bridge inverter connected to the second set of multi-phase stator windings of the second electrical machine, and
wherein, when the apparatus is in a charging mode when charging the battery, the first multi-phase-bridge inverter of the first electrical drive system is connected to a line voltage supply, and the first multi-phase bridge inverter of the first electrical drive system is connected to the second multi-phase bridge inverter of the second electrical drive system which powers the second stator winding of the second electrical machine such that the first stator winding of the second electrical machine will charge the battery through the first multi-phase bridge inverter of the second electrical drive system.

2. An electrical apparatus according to claim 1, wherein the electrical apparatus is adapted to be connected to an AC line supply voltage.

3. An electrical apparatus according to claim 1, wherein the electrical apparatus comprises a line filter connected between the first multi-phase bridge inverter of the first electrical drive system and a connection means.

4. An electrical apparatus according to claim 1, wherein each electrical machine is constituted by either a permanent magnet synchronous machine, a brushless DC machine, an asynchronous machine, an electrically magnetized synchronous machine, a synchronous reluctance machine or a switched reluctance machine.

5. Electrical vehicle, comprising an electrical apparatus according to claim 1.

6. An electrical apparatus, comprising a first electrical drive system, a second electrical drive system, a first electrical machine, a second electrical machine and a battery, wherein each electrical machine comprises a rotor, a first set of multi-phase stator windings and a second set of multi-phase stator windings electrically separated from the first set of multi-phase stator windings, where the first electrical drive system comprises a first multi-phase bridge inverter and a second multi-phase bridge inverter and where the second electrical drive system comprises a first multi-phase bridge inverter connected to the first set of multi-phase stator windings of the second electrical machine and to the battery, and a second multi-phase bridge inverter connected to the second set of multi-phase stator windings of the second electrical machine, wherein, when the apparatus is in a charging mode when charging the battery, the first multi-phase-bridge inverter of the first electrical drive system is connected to a line voltage supply, and the first multi-phase bridge inverter of the first electrical drive system is connected to the second multi-phase bridge inverter of the second electrical drive system, wherein the electrical apparatus comprises a first switch which, when the electrical apparatus is in a traction mode, is adapted to connect the first multi-phase bridge inverter of the first electrical drive system to the second multi-phase bridge inverter of the first electrical drive system, and a second switch which is adapted to connect the first multi-phase bridge inverter of the second electrical drive system to the second multi-phase bridge inverter of the second electrical drive system.

7. A method for charging a battery in an electrical apparatus, the apparatus comprising: a first electrical drive system, a second electrical drive system, a first electrical machine, a second electrical machine and a battery, wherein the first and second electrical machines each comprise a rotor and a first set and a second set of multi-phase stator windings that are magnetically but not electrically coupled to each other, the method comprising:

applying a line voltage through a connecting means to a first multi-phase bridge inverter of the first electrical drive system which is connected to a second multi-phase bridge inverter of the second electrical drive system, where the second multi-phase bridge inverter is connected to the second set of multi-phase stator windings of the second electrical machine and controlled in such a way that a current flows through the second set of multi-phase stator windings of the second electrical machine and creates a torque that drives the machine to a desired speed, inducing a created magnetic field in the first set of multi-phase stator windings of the second electrical machine such that a multi-phase current flows to a first multi-phase bridge inverter of the second electrical drive system, and creating a charge current to the battery with the first multi-phase bridge inverter of the second electrical drive system.

8. Method according to claim 7, wherein the line voltage is an AC voltage and where the first multi-phase bridge inverter of the first electrical drive system is used as a rectifier.

9. Method according to claim 7, wherein a voltage with a desired frequency is created with the second multi-phase bridge inverter of the second electrical drive system, which voltage is fed to the second stator winding of the second electrical machine causing the electrical-machine to rotate with the desired speed.

* * * * *